March 7, 1967 — M. PIRTLE — 3,307,955
METHOD OF COOKING POULTRY
Filed May 7, 1962
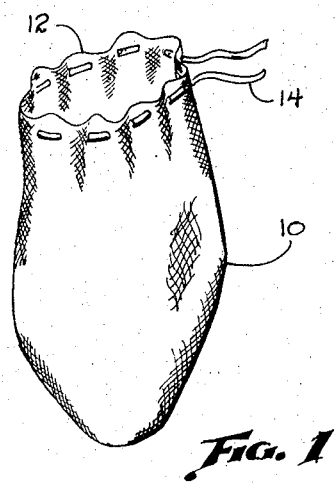
FIG. 1
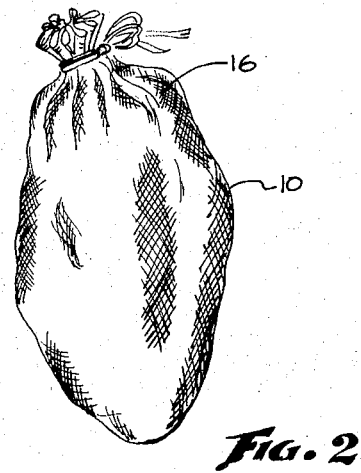
FIG. 2
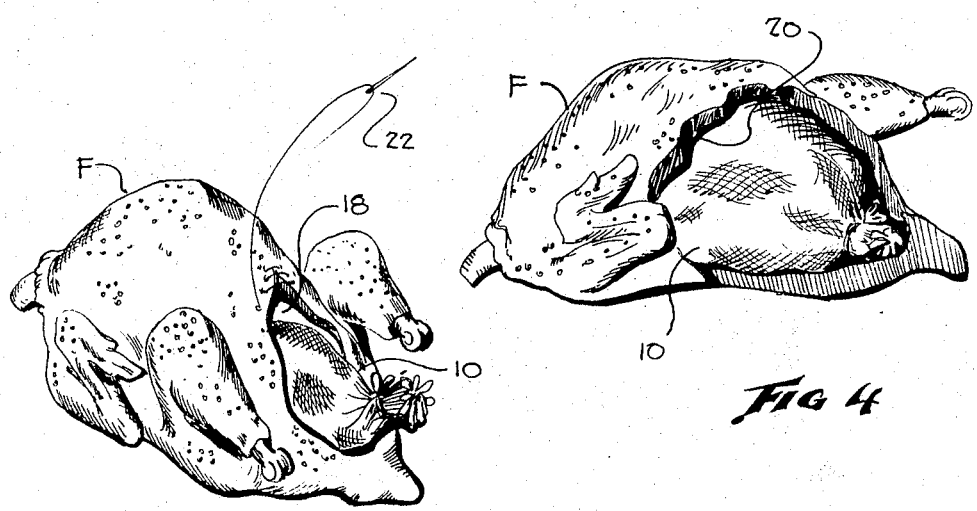
FIG. 3
FIG. 4
INVENTOR.
MABEL PIRTLE
BY LIONEL V. TEFFT
ATTORNEY 340,795,555
METHOD OF COOKING POULTRY
Mabel Pirtle, 3926 Tomlinson Ave.,
Riverside, Calif. 92503
Filed May 7, 1962, Ser. No. 192,780
2 Claims. (Cl. 99—107)

This invention relates generally to poultry stuffing device and particularly to a method of cooking.

One of the main objects of the invention is in the provision of a simple means for handling the stuffing and cooking the dressing in poultry of any kind.

The art of preparing the dressing and the manner of stuffing poultry of all kinds is so well known as to obviate any explanation. The physical operations as known heretofore are not only laborious but rather unpleasant. The cooking operation is relatively simple but removal of the poultry flavored dressing for serving is not easy. The fact that it is almost impossible to remove all of the quickly contaminated dressing from the breast cavity shortens the food usefulness of any type of poultry.

It is a fundamental theory of the present invention to provide a simple device for receiving the poultry dressing of any recipe which may thereafter be placed in the breast cavity during the cooking operation and finally withdrawn for easy serving.

Another object of the invention is to provide reticulated bags for receiving poultry dressing which may be placed in the breast cavity during cooking and removed for serving.

Another object of the invention is in the provision of a cavity forming reticulated bag for receiving any kind of dressing usable as a poultry stuffing.

Yet another object of the invention resides in the method of cooking poultry in which a quickly separated means is used to contain the dressing during the cooking operation.

A further object of the invention is to provide a simple and an inexpensive means for receiving poultry dressing, containing same during the cooking operation and serving same thereafter.

The foregoing and other objects and advantages of the present invention will become apparent to those skilled in the art upon consideration of the following detailed description of the preferred embodiment thereof, reference being had to the accompanying drawings, herein:

FIGURE 1 is a perspective view of the reticulated container forming a preferred embodiment of the invention; and FIGURE 2 is a perspective view of the container of FIGURE 1 filled with dressing and before disposal in the fowl for the cooking operation.

FIGURE 3 is a perspective view of a fowl with the dressing or stuffing container disposed in the breast cavity; and FIGURE 4 is an elevational view partially cut away disclosing the filled container within the fowl.

The cuisinary art of stuffing poultry of all kinds has always been a messy job irrespective of the dressing recipe. The usual moist dressing is hand placed in the breast cavity which is then sewn up or enclosed in some other manner. During the cooking operation the dressing absorbs the flavor and juices of the poultry and is then ready for serving. It is not a particularly easy job to remove the cooked dressing from the fowl for serving. It is almost impossible to remove all of the cooked dressing from the breast cavity. Any dressing, moist or otherwise, remaining in the breast cavity becomes contaminated before the thoroughly cooked flesh itself. Enclosure within the cavity hurries bacteria formation in the stuffing and quick contamination of the fowl.

The device and cooking method used in the present invention eliminates most of the unpleasantness and physical effort that has always attended a very old operation. In FIGURE 1, a reticulated bag 10 is shown having an open end 12 and a draw string securing means 14. It is desired that the bag 10 be formed generally at least to fit within the breast cavity of poultry which obviously vary greatly in size. It is sufficient to say that the bags 10 may be made of cheesecloth or any kind of reticulated material that will contain the dressing and still permit absorption of juice and flavors. The manner in which the bag is formed is relatively unimportant. It is required that the bag 10 have an open end in which the dressing may be quickly placed. FIGURE 2 shows one form of bag 10 filled with dressing 16. A reticulated bag of general cavity shape may be quickly hand molded for insertion in the opening 18 of the fowl. The general position of the stuffed bag 10 within the breast cavity 20 of the fowl F is clearly shown in pantomine in FIGURE 3 and in the cutaway portion of FIGURE 4.

Inasmuch as the bag 10 is secured, the closing operation is not particularly essential. The encased dressing filled bag 10 is now in position to have the insertion opening closed by sewing 22 or the like.

The manner of cooking is immaterial because the dressing or stuffing is properly contained and thoroughly cooked. Following the cooking operation it is a simple matter to remove the bag 10 and serve the contents therefrom or empty same into a serving container. The breast cavity of the fowl contains no remnants of the moist dressing and there is little danger of quick bacteria formation. The overall stuffing, cooking and serving operations are simple, quick and inexpensive. The cost of the bag 10 is negligible because it can be washed and reused. There is no waste whatsoever of the dressing.

The whole operation is convenient and time saving. Unpleasant and messy jobs are alleviated.

While I have shown and described in considerable detail what I believe to be the preferred form of my invention, it will be apparent to those skilled in the art that many changes may be made in the shape and arrangement of the several parts without departing from the broad scope of the invention, as defined in the following claims:

I claim:
1. A method of cooking poultry, comprising:
    filling a reticulated bag with poultry stuffing;
    placing the bag within the breast cavity of a fowl and closing the same in any desired manner;
    cooking for the required period; and finally
    removing the bag and emptying the stuffing into a serving dish.
2. The method of roasting fowl and dressing which comprises placing dressing in a perforated flexible container having a general configuration similar to that of the cavity of the fowl, inserting the container filled with the dressing into the cavity of the fowl, heating the fowl with the contained dressing for a period of time sufficient to effect adequate cooking thereof, and removing the container and its contents from the fowl cavity for separate service.

References Cited by the Examiner

UNITED STATES PATENTS

| | | | |
|---|---|---|---|
| 2,095,510 | 10/1937 | Morgan | 99—174 |
| 2,314,317 | 3/1943 | Walter. | |
| 2,808,091 | 10/1957 | Cumbler | 99—174 X |
| 2,928,748 | 3/1960 | Rogers et al. | 99—194 |

OTHER REFERENCES

"Quick Frozen Foods" September 1945, pages 46 and 47, article entitled Frozen Turkeys Ready To Roast by W. G. Stone.

A. LOUIS MONACELL, *Primary Examiner.*

HYMAN LORD, *Examiner.*